(12) United States Patent
Evangelisti et al.

(10) Patent No.: US 12,251,047 B2
(45) Date of Patent: Mar. 18, 2025

(54) LOOSE PRODUCT DISPENSER

(71) Applicant: DE' LONGHI APPLIANCES S.R.L., Treviso (IT)

(72) Inventors: Paolo Evangelisti, Treviso (IT); Alberto Acciari, Treviso (IT); Nicola Piovan, Treviso (IT)

(73) Assignee: DE' LONGHI APPLIANCES S.r.l., Treviso (IT)

( * ) Notice: Subject to any disclaimer, the term of this patent is extended or adjusted under 35 U.S.C. 154(b) by 351 days.

(21) Appl. No.: 17/787,902

(22) PCT Filed: Dec. 9, 2020

(86) PCT No.: PCT/EP2020/085249
§ 371 (c)(1),
(2) Date: Jun. 21, 2022

(87) PCT Pub. No.: WO2021/122208
PCT Pub. Date: Jun. 24, 2021

(65) Prior Publication Data
US 2023/0035186 A1    Feb. 2, 2023

(30) Foreign Application Priority Data

Dec. 19, 2019    (IT) .................. 102019000024847

(51) Int. Cl.
*G06T 7/00*    (2017.01)
*A47J 42/44*    (2006.01)
(Continued)

(52) U.S. Cl.
CPC .............. *A47J 42/50* (2013.01); *A47J 42/44* (2013.01); *A47J 47/01* (2013.01); *G06T 7/0004* (2013.01); *G06T 2207/30128* (2013.01)

(58) Field of Classification Search
CPC . A47J 42/50; A47J 42/44; A47J 47/01; G06T 7/0004; G06T 2207/30128
(Continued)

(56) References Cited

U.S. PATENT DOCUMENTS

2001/0041041 A1    11/2001    Hetzer
2018/0344088 A1*    12/2018    Alessi ................. A47J 42/44
(Continued)

FOREIGN PATENT DOCUMENTS

DE    29705889 U1    8/1997
DE    10201768 A1    6/2003
(Continued)

OTHER PUBLICATIONS

International Search Report and Written Opinion issued in corresponding International Application No. PCT/EP2020/085249, mailed Mar. 3, 2021.

*Primary Examiner* — Ali Bayat
(74) *Attorney, Agent, or Firm* — Troutman Pepper Locke LLP

(57) ABSTRACT

The loose product dispenser has a container and a sensor with optical barrier for detecting the presence of loose product in the container, the sensor having a transmitter of a light beam, configured to generate the optical barrier between an entry point and an exit point of the light beam from the container, and a receiver of the light beam, the sensor further has an electronic board on which both the receiver and the transmitter are installed, and a light guide configured and arranged to transmit to the reciever the light beam collected from the exit point.

14 Claims, 6 Drawing Sheets

(51) Int. Cl.
*A47J 42/50* (2006.01)
*A47J 47/01* (2006.01)

(58) Field of Classification Search
USPC .......................................................... 382/110
See application file for complete search history.

(56) References Cited

U.S. PATENT DOCUMENTS

| | | | |
|---|---|---|---|
| 2019/0125123 A1* | 5/2019 | Startz | A47J 31/44 |
| 2019/0254464 A1* | 8/2019 | Oddera | G01G 13/29 |
| 2020/0170444 A1* | 6/2020 | Dunkelberg | A23F 5/262 |
| 2020/0375388 A1* | 12/2020 | MacFarlane | G06Q 20/3224 |
| 2021/0022547 A1* | 1/2021 | Stork genannt Wersborg | A47J 31/44 |

FOREIGN PATENT DOCUMENTS

| | | |
|---|---|---|
| EP | 1148444 A1 | 10/2001 |
| EP | 1440641 A1 | 7/2004 |
| EP | 3440969 A1 | 2/2019 |
| WO | 2014003570 A2 | 1/2014 |

\* cited by examiner

LOOSE PRODUCT DISPENSER

CROSS-REFERENCE TO RELATED APPLICATIONS

This is a U.S. national phase application under 35 U.S.C. § 371 of International Patent Application No. PCT/EP2020/085249, filed Dec. 9, 2020, and claims benefit of priority to Italian Patent Application No. 102019000024847, filed Dec. 19, 2019. The entire contents of these applications are hereby incorporated by reference.

TECHNICAL FIELD

The present invention relates to a loose product dispenser comprising a container and an optical barrier sensor for detecting the presence of loose product in the container.

BACKGROUND

The invention relates in particular, but not exclusively, to the coffee machine sector in which the container is more precisely a hopper for unloading coffee beans towards a grinder intended to feed the ground coffee to an infusion chamber, which after receiving the load of ground coffee closes and is subjected to a flow of hot water for the infusion of the coffee which is then dispensed into a cup. Optical barrier sensors having an IR transmitter positioned at a transparent point of the hopper and an IR receiver positioned at a diametrically opposite transparent point of the hopper are known in the coffee machine sector.

These sensors have some drawbacks, mainly related to the correct alignment between the transmitter and the receiver, which significantly complicates the assembly step.

Furthermore, in the assembly line, the correct alignment between transmitter and receiver must be re-established and verified each time the hopper model to be sensorized is changed.

Furthermore, the high costs of the sensor together with the costs associated with the assembly thereof limit the implementation thereof in high-end coffee machines. The technical task of the present invention is, therefore, to provide a loose product dispenser which obviates the drawbacks of the prior art.

SUMMARY

As part of this technical task, an object of the invention is to provide a loose product dispenser which is constructively simplified, robust, reliable and precise, economical and easy to assemble.

The technical task, as well as this and other objects, are obtained according to the present invention by providing a loose product dispenser comprising a container and a sensor for detecting the presence of loose product in the container, said sensor comprising a transmitter of a light beam, configured and arranged to generate an optical barrier that crosses said container between an entry point and an exit point, and a receiver of the light beam, characterized in that said sensor further comprises an electronic board on which both said receiver and said transmitter are installed, and a light guide configured and arranged to transmit to said receiver the light beam collected from said exit point.

There are a number of advantages to integrating the transmitter and receiver into a single electronic board.

The cost of the sensor is greatly reduced by the fact that it employs only one printed circuit, where traditionally the transmitter and receiver each have a dedicated printed circuit.

Since the transmitter and receiver are integrated on a single support, it is no longer necessary to align them during assembly.

Since the transmitter and the receiver are automatically in the alignment condition, the assembly line has increased productivity.

Even if the container model on the assembly line is changed, there are no negative repercussions on productivity, as it is sufficient to replace only the light guide.

The significant reduction in the overall cost allows the implementation of the sensor in machines of any range.

In an embodiment of the invention, said light guide comprises a longitudinally extended body.

In an embodiment of the invention, said longitudinally extended body has a first end optically coupled to said exit point of the light beam and a second end optically coupled to said receiver.

In an embodiment of the invention, a removable fixing means is provided for said light guide.

In an embodiment of the invention, said removable fixing means is provided at the two ends of said longitudinally extended body.

In an embodiment of the invention, said longitudinally extended body is formed by a shaped bar.

In an embodiment of the invention, said shaped bar has the shape of a round bar having rectilinear sections oriented transversally to each other and rounded angular fittings.

In an embodiment of the invention, said transmitter comprises an IR diode and said receiver comprises a photodiode.

In an embodiment of the invention, said board is housed in a box which is opaque to IR.

In an embodiment of the invention, said receiver and said transmitter are separated by a partition wall that is opaque to IR.

In an embodiment of the invention, said entry point and said exit point comprise diametrically opposite portions of container made of transparent material.

In an embodiment of the invention, said entry and/or exit point have a lenticular conformation.

In an embodiment of the invention, said light guide is in polycarbonate.

In an embodiment of the invention, the application of the dispenser to a coffee machine implementing a coffee bean unloading hopper is included.

BRIEF DESCRIPTION OF THE DRAWINGS

Further features and advantages of the invention will more fully emerge from the description of a preferred but not exclusive embodiment of the loose product dispenser according to the invention, illustrated by way of non-limiting example in the accompanying drawings, in which.

DETAILED DESCRIPTION

Figure 1:
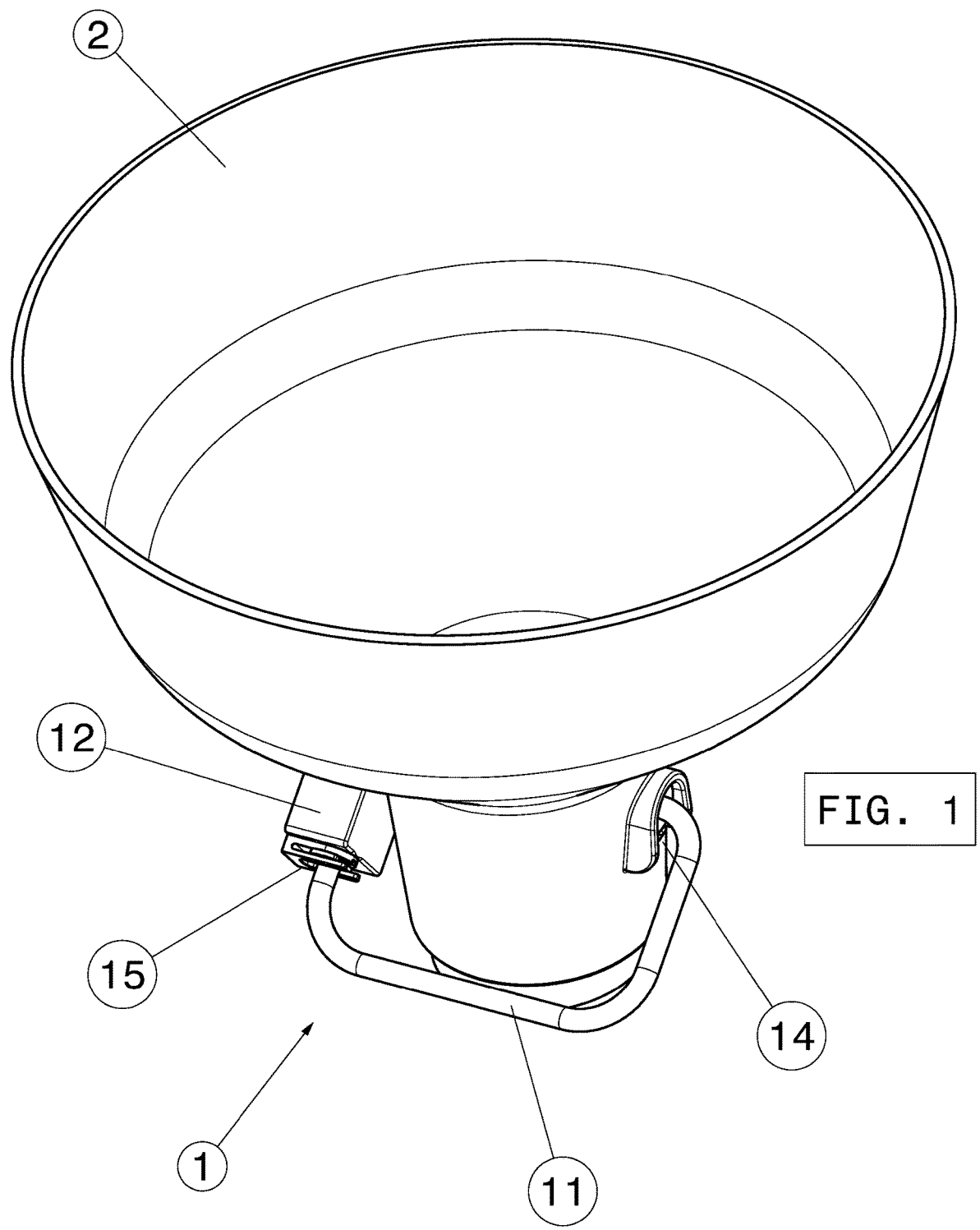
FIG. 1 is an axonometric view of the loose product dispenser.
Figure 2:
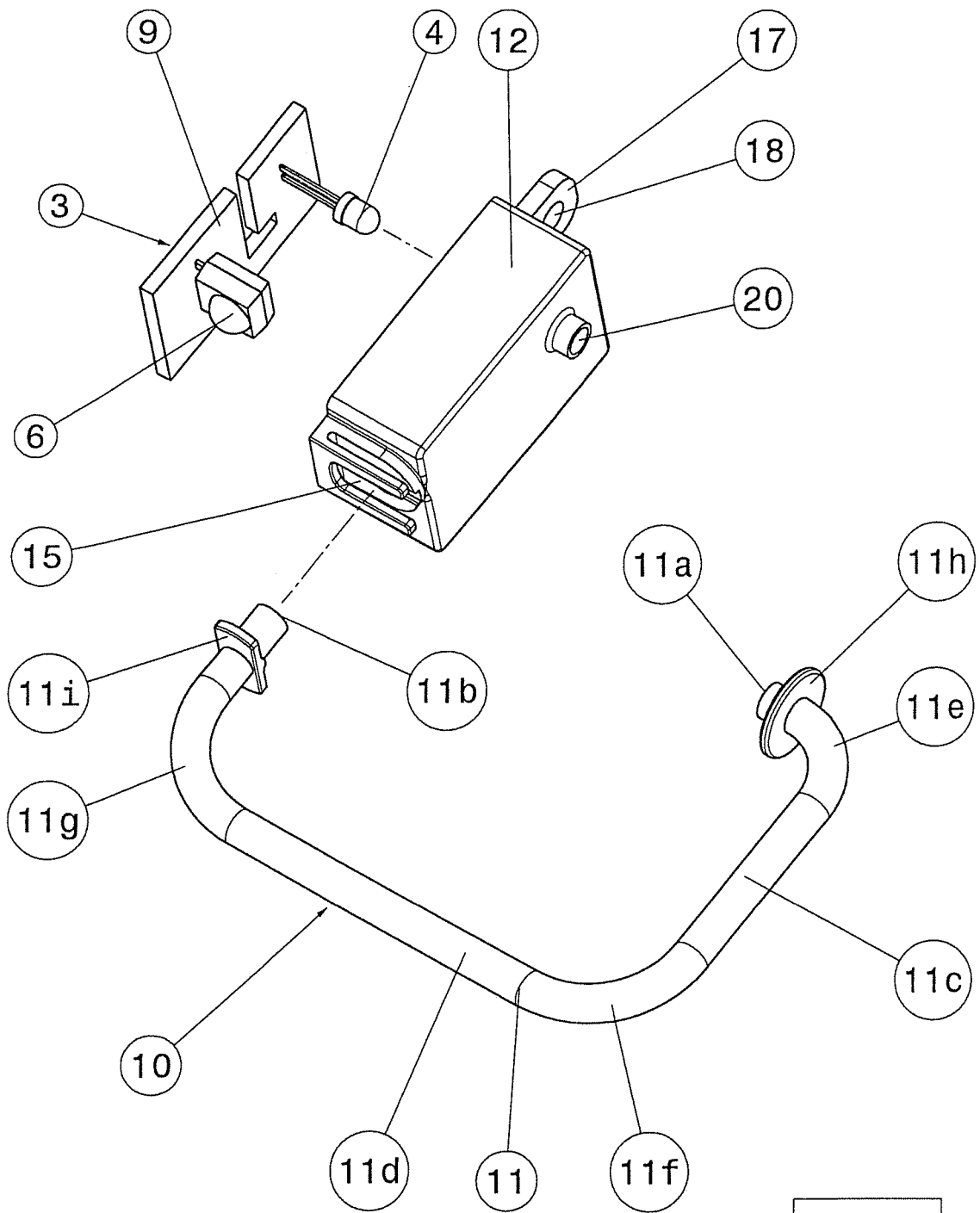
FIG. 2 is an exploded view of the sensor.
Figure 3:
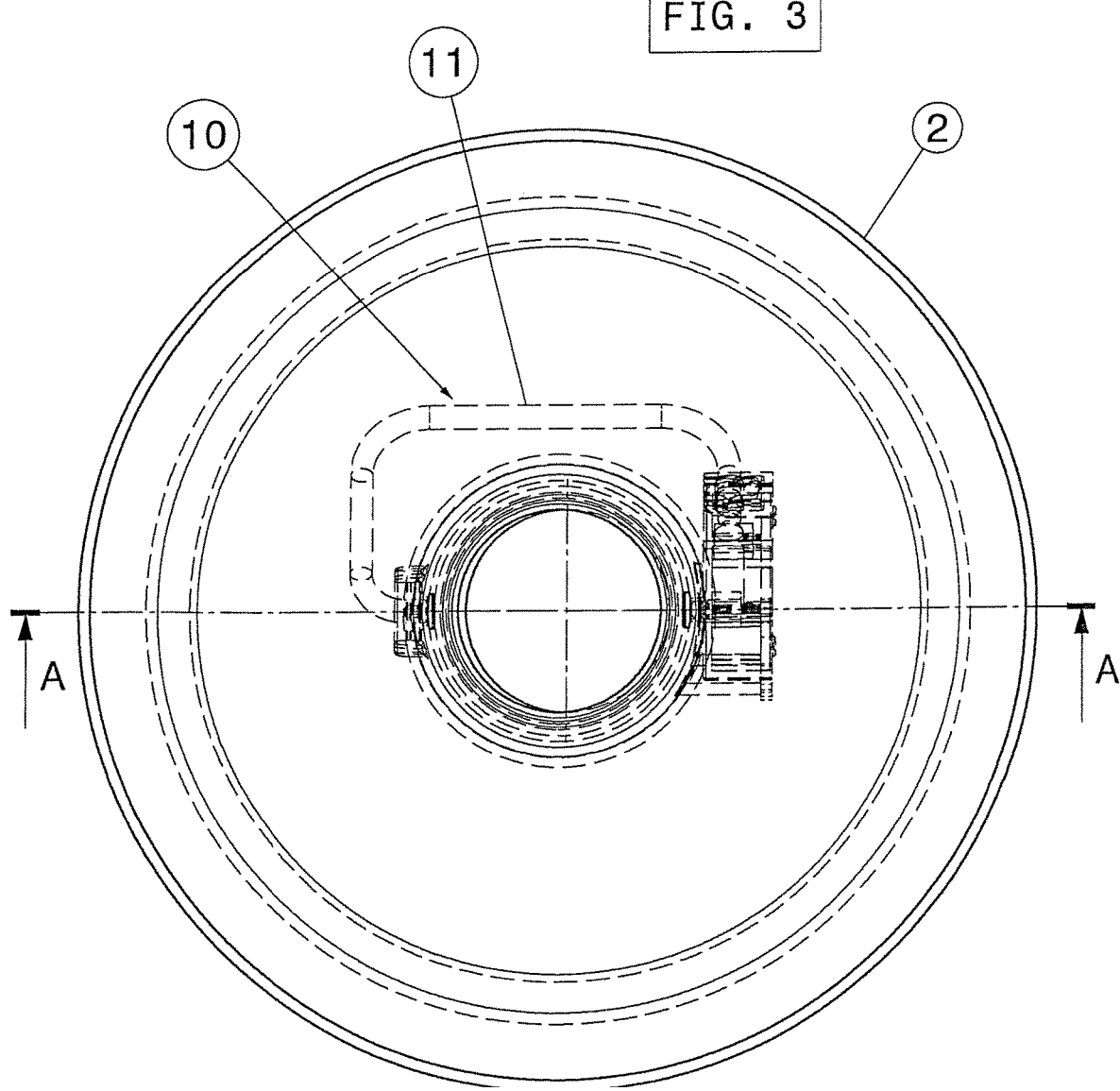
FIG. 3 is a plan view from above of the loose product dispenser.
Figure 4:
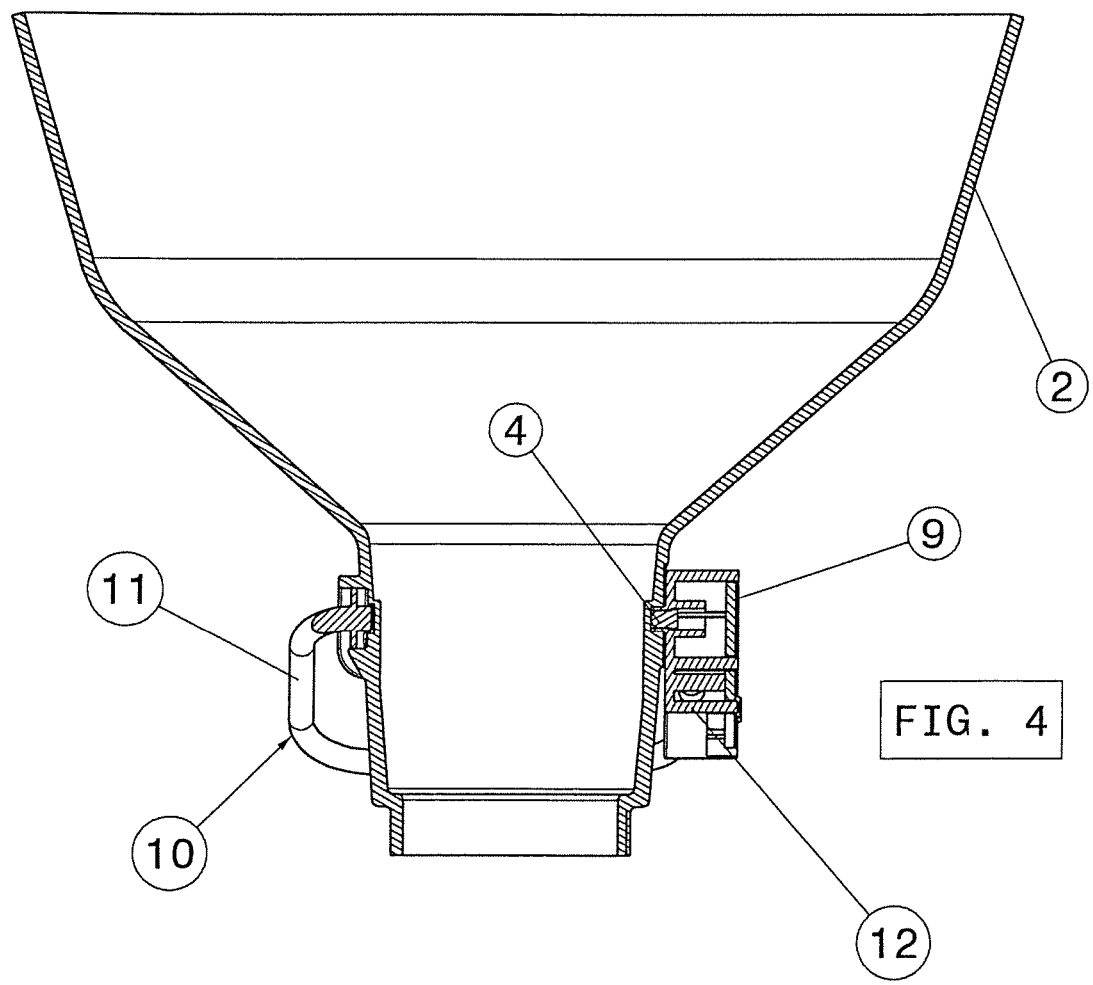
FIG. 4 shows the loose product dispenser sectioned according to the vertical plane A-A of FIG. 3.
Figure 5:
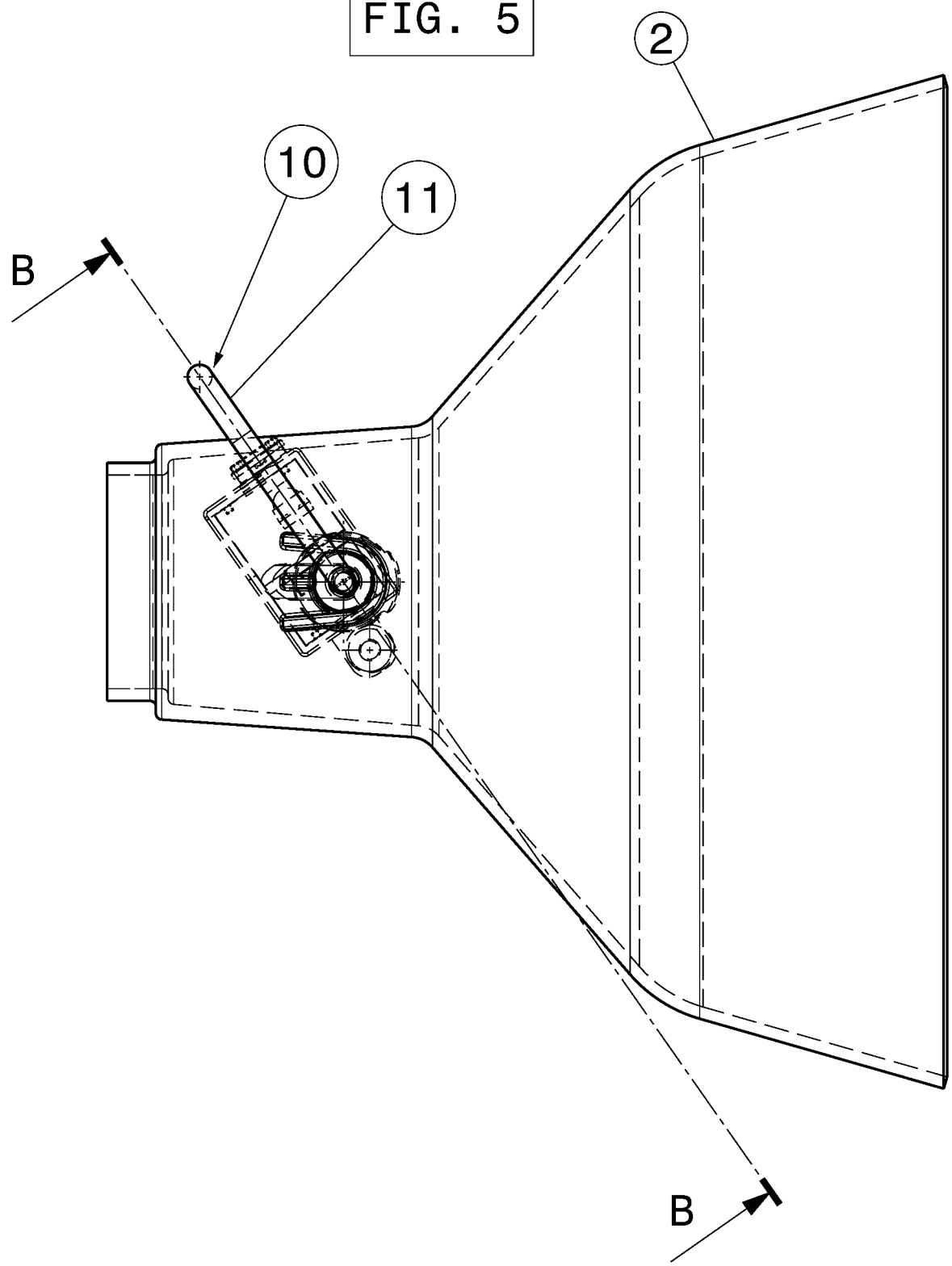
FIG. 5 is a raised side view of the loose product dispenser.
Figure 6:
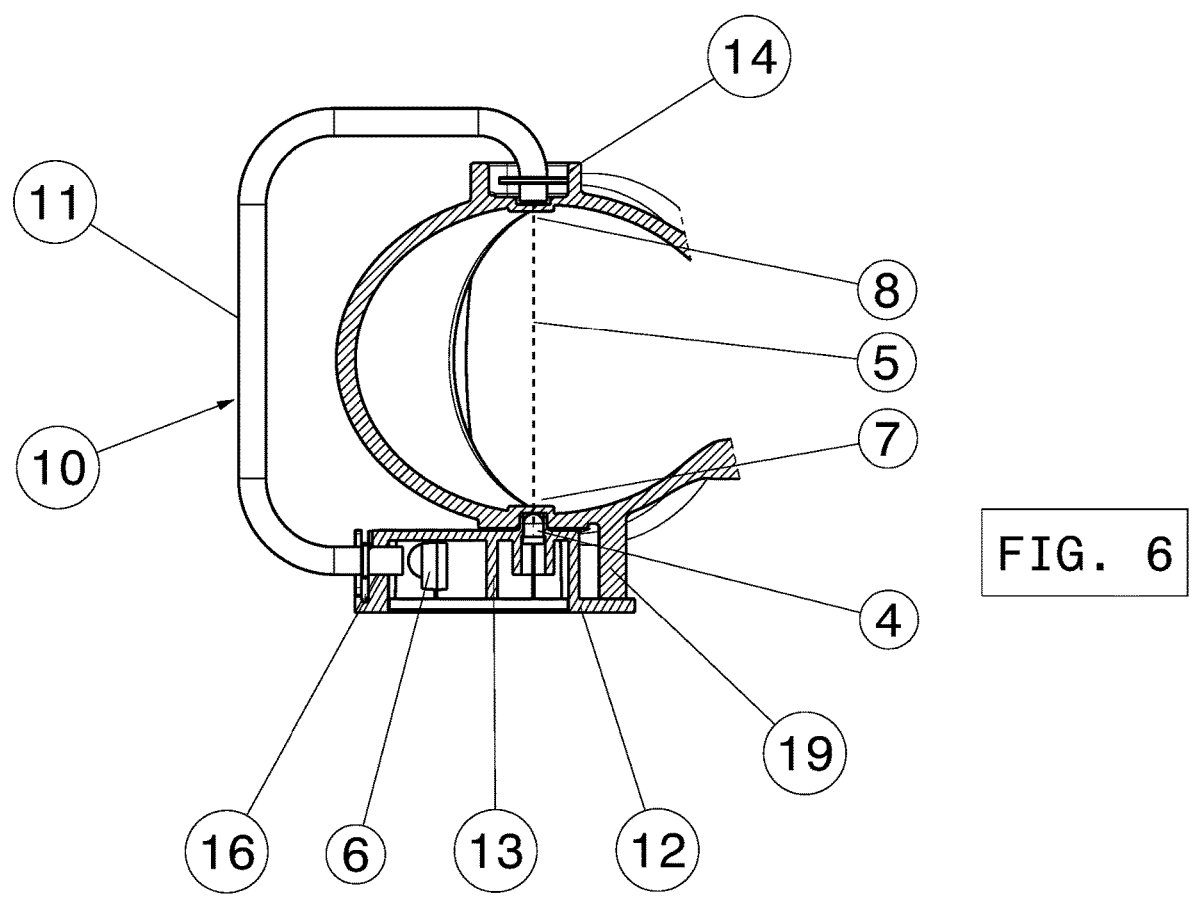
FIG. 6 shows the loose product dispenser sectioned according to the oblique plane B-B of FIG. 5.

With reference to the figures cited, a loose product dispenser is shown and indicated in the entirety thereof by reference number 1.

The loose product dispenser comprises a container 2 and a sensor 3 with optical barrier 5 for detecting the presence of loose product in the container 2.

In the following we will refer specifically to the field of application of coffee machines, where the container 2 of the loose product dispenser is formed in particular by the coffee bean unloading hopper.

The coffee machines in question have in particular a hydraulic circuit comprising at least a cascading water supply pump, a boiler, an infusion unit comprising in turn an infusion chamber, and an infused coffee dispenser.

The aforementioned coffee bean unloading hopper instead feeds a grinder which receives the coffee beans, grinds them and transfers the ground coffee thus obtained to the infusion chamber which, after receiving the load of ground coffee, closes and is subjected to a flow of hot water for the infusion of the coffee which the infused coffee dispenser dispenses into a cup.

Obviously the scope of the invention can be extended to all applications where it is required to check for the presence of loose product in a container.

The sensor 3 comprises a transmitter 4 of a light beam and a receiver 6 of the light beam.

The transmitter 4 preferably comprises an IR diode while the receiver 6 preferably comprises an IR photodiode.

The transmitter 4 generates the optical barrier 5 which crosses the container 2 between an entry point 7 and an exit point 8.

The entry point 7 and the exit point 8 specifically comprise diametrically opposite portions of the container 2 made of transparent material.

The entry point 7 and/or exit point 8 can have a lenticular conformation to limit light scattering.

Advantageously, the sensor 3 comprises a single electronic board 9 on which both the receiver 6 and the transmitter 4 are installed.

The sensor 3 further has a light guide 10 configured and arranged to transmit to the receiver 6 the light beam collected from the exit point 8.

The light guide 10 comprises a longitudinally extended body 11.

The longitudinal body 11 has a first end 11a optically coupled to the exit point 8 of 5 the light beam and a second end 11b optically coupled to the receiver 6.

In particular, the longitudinal body 11 is formed by a shaped bar.

The shaped bar extends outside the container 2 and is preferably made of polycarbonate or other material which, together with the shape and size of the shaped bar itself, is suitable for transmitting an IR light beam without appreciable scattering.

The shaped bar in this case has the shape of a round bar.

The round bar in turn has rectilinear sections 11c, 11d oriented transversally to each other and rounded angular fittings 11e, 11f, 11g.

In detail, two rectilinear sections 11c, 11d and three rounded angular fittings 11e, 11f, 11g are provided at 90° for the transmission of the light beam along as long and winding a path as possible.

The shape of the round bar is not only designed to find the shortest path but above all to reduce light flux losses. In practice, it is constructed according to the rules of optics such as diameter, material and shape.

In an embodiment of the sensor 3, the wavelength of the light signal is 940 nm, typical of commercial sensors and positioned in the infrared (IR) field.

In an embodiment of the light guide 10, the diameter of the longitudinal body 11 is not less than 2 mm and not more than 6 mm for the cost-effectiveness of the component and ease of moulding.

In an embodiment of the light guide 10, the refractive index of the material forming the longitudinal body 11 is between 1.3-1.7.

This refractive index is typical of materials such as PMMA, PC, PSU which can therefore be used for the purpose.

In an embodiment of the light guide 10, the radius of curvature of the longitudinal body 11 is preferably not less than twice the diameter of the longitudinal body 11.

In an embodiment of the light guide 10, the rectilinear sections of the longitudinal body 11, which have no particular influence on signal loss, have a length between 20 mm and 120 mm.

The advantage of the sensor 3 is that it can be parametrised to fit various hopper shapes by changing only the length of the rectilinear sections of the longitudinal body 11.

The board 9 is housed in a box 12 opaque to IR fixed outside the container 2. For the fixing, the opaque box 12 includes an outer tab 17 equipped with an engagement eyelet 18 for a fixing pin 19 which extends from the outer wall of the container 2.

Inside the box 12, the receiver 6 and the transmitter 8 are separated by a partition wall 13 opaque to IR which eliminates mutual interference.

The opaque box 12 has a through hole 20 calibrated for the passage outside the transmitter 4 which can thus be positioned substantially in direct contact with the wall of the container 2 at the entry point 7 of the light beam.

The wave guide 10 is removably fixed to the container 2.

The removable wave guide fixing means 10 is located at the two ends of the longitudinally extended body 11.

In detail, the removable fixing means of the wave guide 10 comprises first quick snap fitting means between the first end 11a of the longitudinal body 11 and the container 2 and second quick snap fitting means between the second end 11b of the longitudinal body 11 and the box 12.

The first snap fitting means between the first end 11a of the longitudinal body 11 and the container 2 comprises a connector 11h formed by a first flange retracted from the first end 11a of the longitudinal body 11 and a grooved engagement seat 14 for the connector 11h formed outside a portion of the container wall 3 including the exit point 8 of the light beam.

The first end 11a of the longitudinal body 11 can thereby be substantially in direct contact with the wall of the container 2 at the exit point 8 of the light beam.

The second snap fitting means between the second end 11b of the longitudinal body 11 and the box 12 comprises a connector 11i formed by a second flange retracted from the second end 11b of the longitudinal body 11 and a grooved engagement seat 15 for the connector 11i formed outside a portion of the wall of the box 12 including a through hole 16 through which the section of the longitudinal body 11 comprised between the second flange and the second end 11b penetrates the box 12.

The second end 11b of the longitudinal body 11 can thereby be substantially in direct contact with the receiver 6.

The operation of the loose product dispenser is briefly as follows.

When there is a quantity of coffee beans in the hopper which exceeds the level in height at which the optical barrier 5 is positioned, the light beam generated by the transmitter 4 cannot reach the light guide 10 nor therefore the receiver 6.

When instead the quantity of coffee beans in the hopper falls below the level at which the optical barrier 5 is positioned, the light beam generated by the transmitter 4 finds no obstacles and can reach the light guide 10, from which it is transmitted to the receiver 6, causing the sensor 3 to change state.

The loose product dispenser as conceived herein is susceptible to numerous modifications and variants, all falling within the scope of the inventive concept; furthermore, all the details are replaceable by technically equivalent elements. In practice, the materials used, as well as the dimensions, can be any according to the needs and the state of the art.

The invention claimed is:

1. A loose product dispenser comprising a container and a sensor detecting the presence of loose product in the container, said sensor comprising a transmitter of a light beam, configured and arranged to generate an optical barrier that crosses said container between an entry point and an exit point, and a receiver of the light beam, wherein said sensor further comprises an electronic board on which both said receiver and said transmitter are installed, and a light guide configured and arranged to transmit to said receiver the light beam collected from said exit point.

2. The loose product dispenser according to claim 1, wherein said light guide comprises a longitudinally extended body.

3. The loose product dispenser according to claim 1, wherein said longitudinally extended body has a first end optically coupled to said exit point of the light beam and a second end optically coupled to said receiver.

4. The loose product dispenser according to claim 2, wherein it comprises a removable attachment of said light guide.

5. The loose product dispenser according to claim 2, wherein said removable attachment is located at the two ends of said longitudinally extended body.

6. The loose product dispenser according to claim 2, wherein said longitudinally extended body is formed by a shaped bar.

7. The loose product dispenser according to claim 2, wherein said shaped bar has the shape of a round bar having rectilinear sections oriented transversally to each other and rounded angular fittings.

8. The loose product dispenser according to claim 2, wherein said board is housed in a box that is opaque to an infrared light-emitting diode (IR LED) (IR).

9. The loose product dispenser according to claim 2, wherein said receiver and said transmitter are separated by a partition wall opaque to an infrared light-emitting diode (IR LED) (IR).

10. The loose product dispenser according to claim 1, wherein said entry point and said exit point comprise diametrically opposite portions of container made of transparent material.

11. The loose product dispenser according to claim 2, wherein at least one of said entry point and the exit point have a lenticular conformation.

12. The loose product dispenser according to claim 2, wherein said transmitter comprises an infrared light-emitting diode (IR LED) (IR) diode and said receiver comprises an infrared light-emitting diode (IR LED) (IR) photodiode.

13. The loose product dispenser according to claim 8, wherein the removable attachment comprises first quick snap fitting between said first end of said longitudinal body and said container and second quick snap fitting between said second end of said longitudinal body and said box.

14. A coffee machine comprising a dispenser of loose product according to claim 1, wherein the loose product is a plurality of coffee beans.

* * * * *